UNITED STATES PATENT OFFICE.

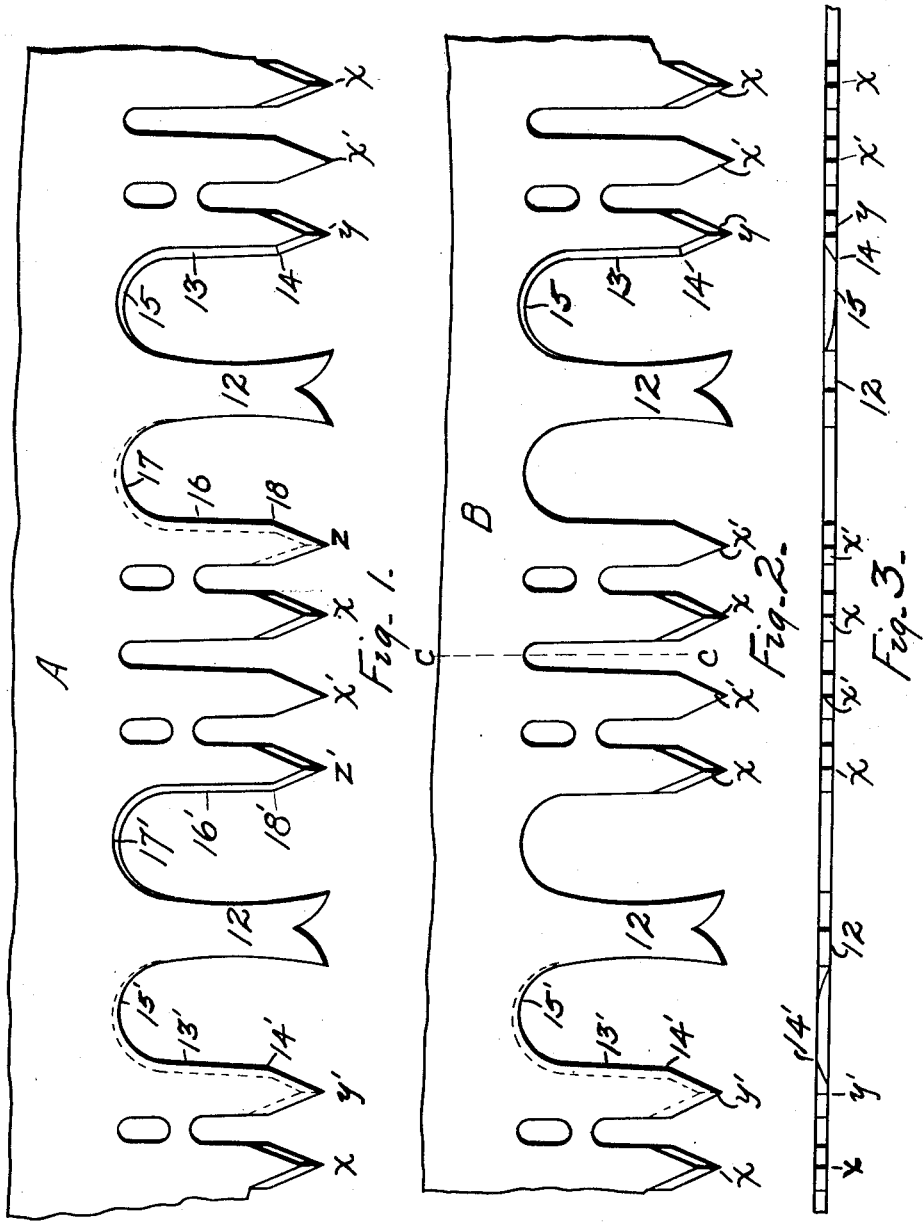

EDWIN J. BARNES, OF SNOWDEN, WASHINGTON.

CROSSCUT-SAW.

No. 913,092.     Specification of Letters Patent.     Patented Feb. 23, 1909.

Application filed July 23, 1906. Serial No. 327,373.

*To all whom it may concern:*

Be it known that I, EDWIN J. BARNES, a citizen of the United States, residing at Snowden, in the county of Klickitat and State of Washington, have invented a new and useful Improvement in Crosscut-Saws, of which the following is a specification, reference being had to the accompanying drawings.

My invention relates to improvements in cross-cut saws.

The object of my invention is to provide a saw having teeth with shoulders so beveled that the shavings in the saw kerf shall be quickly and surely ejected by the saw. I attain these objects, and other practical advantages, by the construction, combination and arrangement of parts illustrated in the aforesaid drawings.

It is well known that cross-cut saws heretofore in use will easily clog up with sawdust, and particularly shavings made by the raker bits, said shavings being from four to eighteen inches in length. These shavings, because of the plane vertical edges of the teeth and rakers in the old form of saw are retained within the space between the rakers and teeth as the saw reënters a log, thus interfering with its effective cutting powers, or preventing it entirely from cutting. No device has heretofore been invented to satisfactorily overcome this as my invention does. It will be clearly seen that I have provided a saw which will cause the shavings and saw-dust to promptly fall away from the saw on each side of the log as the saw teeth are withdrawn from it, and this result my device insures with regularity and accuracy, thus reducing friction and increasing the effectiveness of the saw, besides accomplishing a large saving of power in operating such a saw, especially upon the rough and unseasoned timber where they are mostly used, as well as elsewhere.

Figure 1 is a side view of a portion of a cross-cut saw with part of the top cut away, and wherein the saw teeth are beveled on vertical edges opposite the rakers. Fig. 2 is a side view of a portion of a cross-cut saw with part of the top cut away, and wherein the saw teeth are beveled alternately on edges opposite the rakers, the beveled edges facing the center from each end. Fig. 3 is a view of the edge of the saw in the form shown in Fig. 2, looking at the teeth points.

Like numerals and letters refer to like parts throughout the views.

All the views show a cross-cut saw of the kind in common use, but otherwise provided with my beveled tooth edge device. The form of saw shown has double teeth $x$—$y'$, $z'$—$x'$, $x$—$z$, $y$—$x'$ and $x$, integral with the saw blades. Between the rakers 12, these double teeth may be arranged, singly or alternately, in pairs and singly, or in pairs as herein shown.

In Fig. 2, from the points 14—14' on the same side of the edge of the teeth $y$—$y'$, whereon their points are beveled; bevels 13—13', of suitable form and dimensions, extend upwardly from the points 14—14', and a suitable distance along the arches 15—15' of the tooth spaces. These teeth bevels may be provided upon the teeth throughout the saw, so that an arrangement results whereby all bevels on either side of the center of the saw indicated by the line C—C, Fig. 2, shall face toward that center. This arrangement is also shown in Fig. 3.

In Fig. 1 the same form of bevels upon similar teeth is shown as in Fig. 2, and as already described. In addition to this the teeth $z$—$z'$ of the saw blade A, Fig. 1, may be formed with bevels 16—16' on the same side of the edge of the teeth whereon their points are beveled, and these bevels, of suitable form and dimension, extend upwardly from the points 18—18' and a suitable distance along the arches 17—17' of the tooth spaces. This form and arrangement of the beveled teeth may be continued throughout the saw.

It will now be seen that my device, being a cross-cut saw having integral teeth on the saw blade, may in the first instance be provided with these novel and useful bevels for the saw teeth as above described, facing the center of the saw from each end, and when so arranged the shaving raised by the planing bits of the rakers 12 will not be retained within the spaces between the rakers and the teeth. That when one-half of the saw is pulled or pushed out of the log or timber these shavings must fall away from the saw because of the beveled edges. It is well known that as at present made the rakers and the teeth opposite to each edge of same all present toward each other, oppositely disposed plane vertical surfaces the same full thickness as that of the rakers. Also that this causes stiff, strong shavings of varying lengths from 4 to 18 inches to be formed within the saw kerf, and to be rolled up and held together with saw-dust wholly within the space between the teeth and the rakers, and in this position to be carried back when so held by the saw into the log or timber again, thus materially decreasing the capacity of the saw and increasing the friction, besides thus causing much loss of power in operating the saw, as those experienced in the use thereof well know. It is only by the use of saws made according to my device that these material difficulties can be overcome.

The bevels upon the teeth may be arranged as shown in either of the figures and as already described, to accomplish the same result, according to the judgment of the user and the kind of material which it is intended to saw.

Now having described my invention, I do not limit myself to the precise form and size of apertures and teeth nor the arrangement of same herein described, as changes in such matters may easily be made by persons skilled in the art and yet not depart from the principle of my invention.

I claim:

1. A cross-cut saw having cutting-teeth and interposed raker-teeth with curved arches between teeth of different kinds, said raker-teeth having plane edges and said cutter-teeth having non-cutting bevels on the same side as and extending from their points to and across said arches.

2. A cross-cut saw having cutting-teeth and interposed raker-teeth with curved arches between teeth of different kinds, said raker-teeth having plane edges and said cutter-teeth having on those edges which face the center of the saw non-cutting bevels extending from their points to and across said arches.

EDWIN J. BARNES.

Witnesses:
M. C. WRIGHT,
F. C. SELLWOOD.